(No Model.)
G. H. STOUT.
IMPLEMENT FOR DEHORNING CATTLE.
No. 448,092. Patented Mar. 10, 1891.
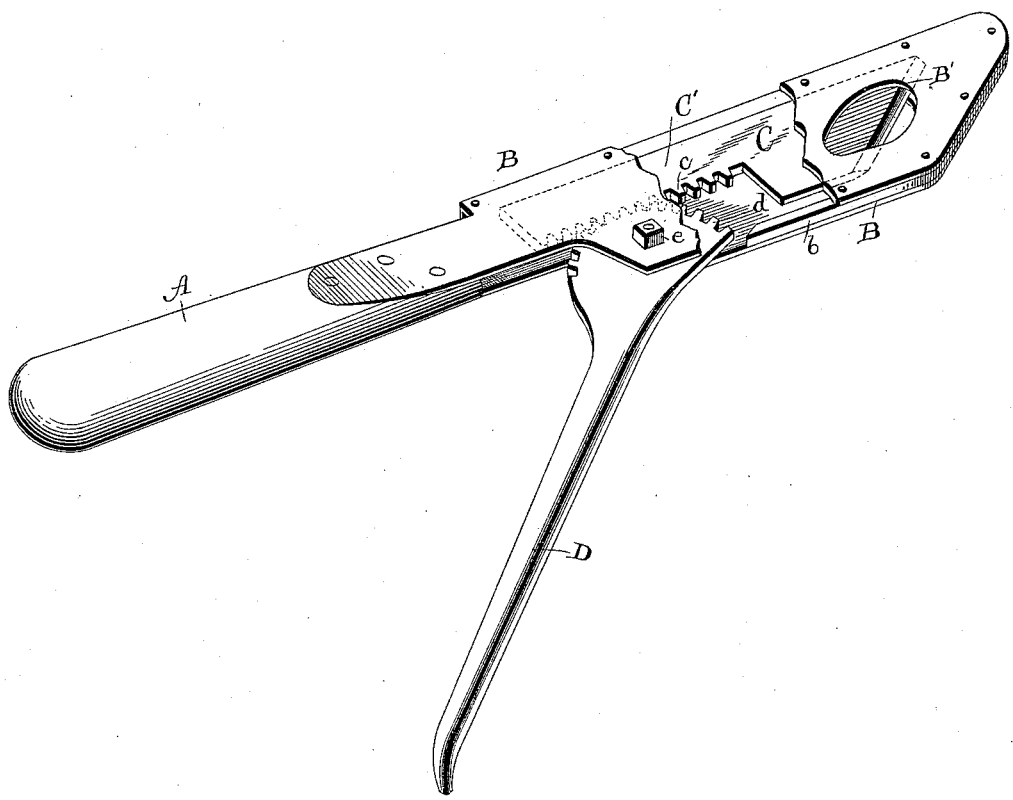
Witnesses
E. W. Johnson
H. L. Beall
George H. Stout
Inventor
by [signature]
Attorney

United States Patent Office.

GEORGE H. STOUT, OF MARCELINE, MISSOURI.

IMPLEMENT FOR DEHORNING CATTLE.

SPECIFICATION forming part of Letters Patent No. 448,092, dated March 10, 1891.

Application filed November 29, 1890. Serial No. 373,059. (No model.)

*To all whom it may concern:*

Be it known that I, GEORGE H. STOUT, a citizen of the United States of America, residing at Marceline, in the county of Linn and State of Missouri, have invented certain new and useful Improvements in Implements for Dehorning Cattle; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in implements for dehorning cattle.

The object of the invention is to provide a cheap, simple, and effective implement having an aperture which receives the horn to be removed, which aperture is bisected by a cutter, which is positively moved by a pivoted handle having teeth which intermesh with the teeth formed on the shank of the cutter; and the invention consists in the construction and combination of the parts, as will be hereinafter fully set forth, and particularly pointed out in the claims.

The drawing forming part of this specification is a perspective view partly broken away to better show the construction of the implement.

A refers to the grasping-handle, to which is rigidly secured the side plates B B, these plates being connected to the handle and to a strip $b$ by rivets. The plates B B are practically united so as to leave a space between them, within which is located a blade C, the shank C' thereof being formed on one side with teeth $c$, which forms a rack-bar, with which the teeth $d$ on the lever D engage, this lever being pivoted between the plates B B by a bolt $e$. The opening between the plates B B, which is partly occupied by the end of the lever D, is of such a size that the knife or cutter can be passed through the same when the bolts $e$ and lever D are removed, thus providing a way for readily removing the knife C when it is desired to sharpen the same. This knife lies between the two plates B B, and is of such a width that it lies between the two straight sides of the bar $b$ and slides upon the longer side of said bar. The cutting-edge of the knife is inclined, as shown, and is sharpened from both sides, and the plates B B have oval apertures B', through which the horn is passed.

When it is desired to dehorn cattle, the knife is retracted to its full extent by moving the lever D away from the handle and the implement positioned upon the horn. Then by drawing the lever quickly toward the handle A the knife will be projected and the horn removed by a quick sliding cut.

Having thus described my invention, I claim—

1. The combination, in an implement for dehorning cattle, of the plates B B, rigidly secured to a handle so as to be on a line therewith, said plates being connected to each other and provided with correspondingly-shaped openings B', located one above the other, so as to provide bearings above and below the cutter, a movable cutter having an inclined cutting-edge located between said plates and provided on one side with a rack-bar, and a lever pivoted between the plates and provided with a toothed portion which engages with the rackbar, whereby the implement can be rigidly held while the cutter is being operated, substantially as shown, and for the purpose set forth.

2. In a dehorning implement, the combination of the handle A, plates B B, located one above the other and provided with oval apertures, said plates being rigidly secured to each other and to the handle, a strip $b$, terminating so as to provide an opening through which the sliding cutter may be passed and a straight portion against which said sliding cutter bears, and a lever removably secured to the side pieces for operating the sliding cutter, substantially as shown, and for the purpose set forth.

In testimony whereof I affix my signature in presence of two witnesses.

GEORGE H. STOUT.

Witnesses:
 C. C. MANSFIELD,
 H. A. DINSMORE.